Figure 3:
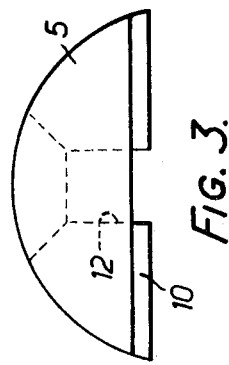

United States Patent

[11] 3,597,104

[72] Inventor Frederick James Salcumbe
Bromsgrove, England
[21] Appl. No. 729,598
[22] Filed May 16, 1968
[45] Patented Aug. 3, 1971
[73] Assignee Donald Frederick Jones
Bromsgrove, England
a part interest

[54] REAMING TOOLS
9 Claims, 14 Drawing Figs.
[52] U.S. Cl. .................................................... 408/199,
29/96
[51] Int. Cl. .................................................. B23d 77/02
[50] Field of Search .......................................... 77/58, 56,
72, 75; 29/96, 103

[56] References Cited
UNITED STATES PATENTS
| 318,994 | 6/1885 | Lake | 77/72 |
|---|---|---|---|
| 349,475 | 9/1886 | Barclay | 29/102 |
| 1,435,709 | 11/1922 | Kelly | 77/56 |
| 663,455 | 12/1900 | Muehlberg | 77/75 |

FOREIGN PATENTS
| 898,880 | 6/1962 | Great Britain | 29/105.1 |
|---|---|---|---|

Primary Examiner—Francis S. Husar
Attorney—Young & Thompson

ABSTRACT: A reaming tool comprising a reaming cutter with opposed cutting edges and a toolholder with a slot or lateral through aperture for the reception of the cutter. The holder has retaining means which act to retain the cutter within the slot or aperture with a limited degree of float radially of the reaming axis and generally in the plane containing the cutting edges, the float being in the form of guided sliding movement of the cutter within the slot or aperture.

Patented Aug. 3, 1971

3,597,104

3 Sheets-Sheet 1

INVENTOR
FREDERICK JAMES SALCUMBE
BY Young & Thompson
ATTORNEYS

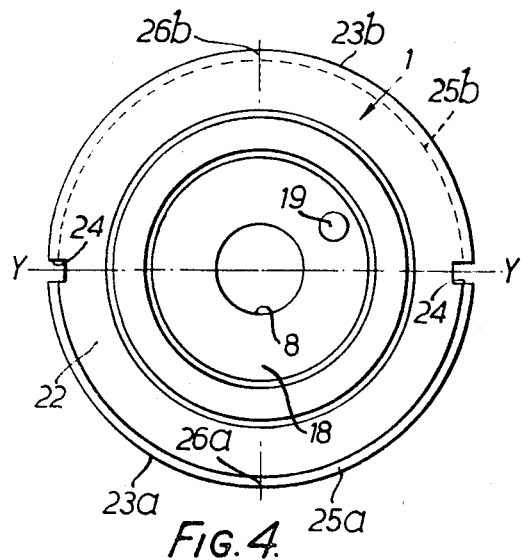
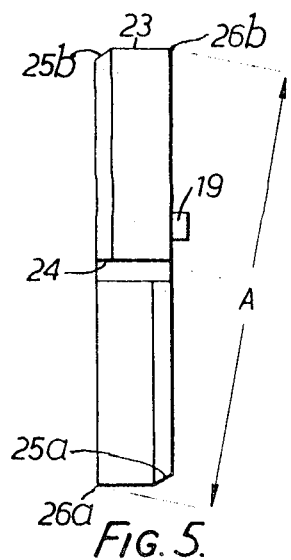
FIG. 4.   FIG. 5.
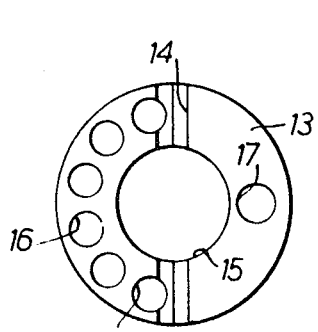
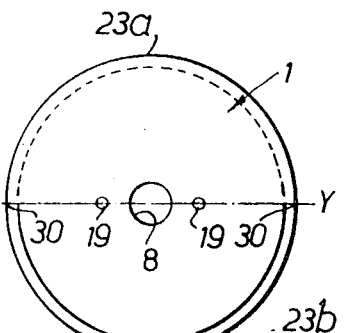
FIG. 6.   FIG. 7.
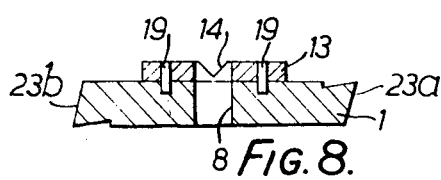
FIG. 8.
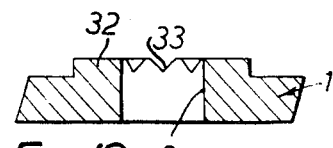
FIG. 10.
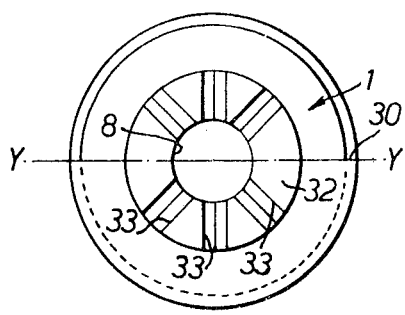
FIG. 9.
INVENTOR
FREDERICK JAMES SALCUMBE
BY
Young & Thompson
ATTORNEYS Patented Aug. 3, 1971

3,597,104

3 Sheets-Sheet 3

INVENTOR
FREDERICK JAMES SALCUMBE
BY Young & Thompson
ATTORNEYS

REAMING TOOLS

This invention relates to reaming tools, and also to reaming cutters and to toolholders therefor.

According to one aspect of the invention a reaming cutter has opposed cutting edges which are both operative during a reaming operation at diametrically opposite points on the bore being reamed, and is adapted to be mounted in or on a toolholder with a degree of float radially of the reaming axis and generally in the plane containing the cutting edges. Reference herein to the "reaming axis" is intended to refer to the axis which coincides with the axis of the bore being reamed. The provision of radial float ensures that the cutter is self-centering and hence remains concentric with the bore being reamed and is not subjected to the lateral side thrusts which are imparted to a cutter when the latter is rigidly mounted on the holder and which in known reaming tools can cause the reamed bore to deviate from the required cylindrical form.

The cutter may be of generally disklike form and adapted to be mounted in or on the holder with a diameter of the disk parallel to the reaming axis. The cutter may be formed for location, in any one of a plurality of different angular positions, on a location plate of the toolholder which itself has a degree of float radially of the reaming axis. Such location may be achieved by means of a dowel peg projecting from one radial face of the cutter and engageable with any one of an arcuate series of holes on one diametrical side of the location plate which locates in a corresponding circular recess in the cutter. The location plate preferably has a diametrical groove engaged by a corresponding guide rib formed on the holder, the rib sliding within the groove to provide the floating action. The interengagement of the dowel peg with one of the holes in the location plate enables the cutter to be mounted on the holder in any one of a plurality of angular positions so that the cutter may readily be moved to a new position to utilize fresh sections of the cutting edge as the latter wears.

Alternatively, the cutter may, instead of having pegs, be formed with a plurality of angularly spaced diametral grooves which terminate short of the outer peripheral edge of the cutter and any one of which may, when the cutter is mounted in the holder, be directly engaged by the guide rib formed on the holder.

The cutter conveniently has a central circular aperture which is oversize with respect to the shank of a screw which retains the cutter in the holder with a degree of float, on either side of a central position, determined by the clearance of the screw within the aperture.

Instead of being of disklike shape, the cutter may be of rod or bar form and longitudinally slidable in a cross slot formed in an end face of the holder, each end of the cutter having a cutting edge. The sliding movement of the cutter within the cross slot, which provides the radial float, is conveniently limited by the interengagement of the edges of a recess in the cutter with a projection formed on an end plate secured to the end of the holder.

The cutter when of rod or bar form may be one of two such cutters respectively slidable in two mutually perpendicular cross slots in the end of the holder so that the four cutting edges are operative simultaneously. At their centers, the cutters are conveniently slotted to overlap one another in the manner of a half-lap joint, each slot being wider than the common width of the cutters to allow radial floating movement of each cutter within the corresponding toolholder slot. The cutters may be retained by an end plate secured to the shank of the holder by a screw which passes through apertures in the cutters with a clearance sufficient to allow for the radial floating movement of the cutters.

Whether one or two cutters of rod or bar form are employed, the cutting edges may be provided by separate cutting tips detachably secured to the corresponding end of the or each cutter. Each tip is conveniently of disklike form with a peripheral cutting edge and attached by means of a screw which can be slackened off so that the tip can be turned to utilize fresh sections of the cutting edge as the latter wears.

According to another aspect of the invention a toolholder has a slot or lateral through aperture for the reception of a reaming cutter with opposed cutting edges, and retaining means which act to retain the cutter within the slot or aperture with a limited degree of float radially of the reaming axis and generally in the plane containing the cutting edges.

In one preferred embodiment guide means which engage a circular cutter to guide the floating movement thereof take the form of a guide rib formed on a detachable sideplate which closes one side of the slot, and the retaining means may be a screw which passes through the cutter and also fixes the sideplate in position.

According to a further aspect of the invention a reaming tool comprises a reaming cutter with opposed cutting edges and a toolholder with a slot or lateral through aperture for the reception of the cutter, the holder having retaining means which act to retain the cutter within the slot or aperture with a limited degree of float radially of the reaming axis and generally in the plane containing the cutting edges, the float being in the form of guided sliding movement of the cutter within the slot or aperture.

The invention will now be further described with reference to the accompanying drawings which show, by way of example, three reaming tools in accordance with the invention, together with two further reaming tools which represent modifications of one of the first three.

Figure 1:
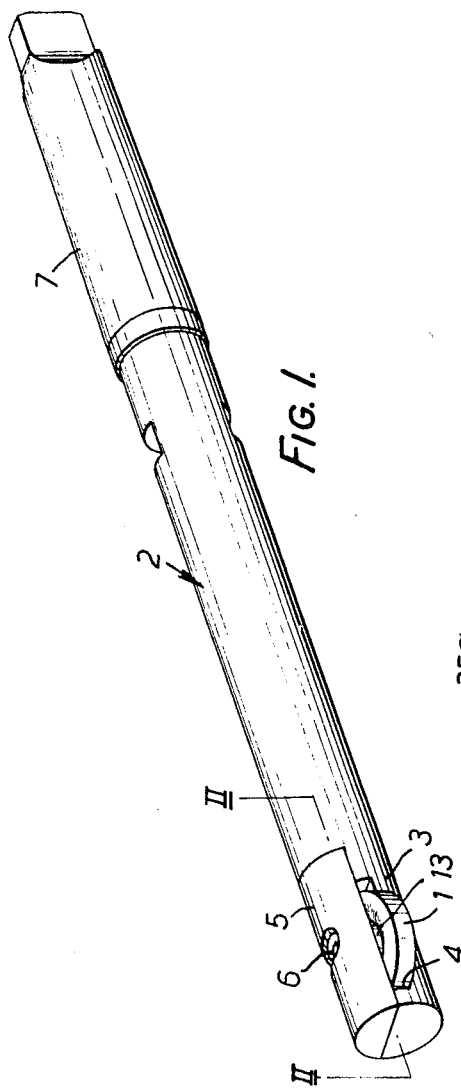
Figure 2:
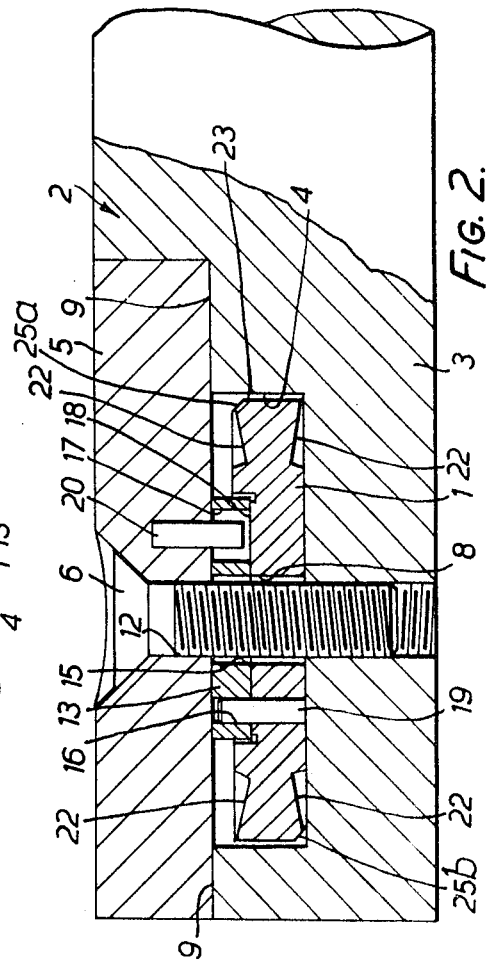
Figure 11:
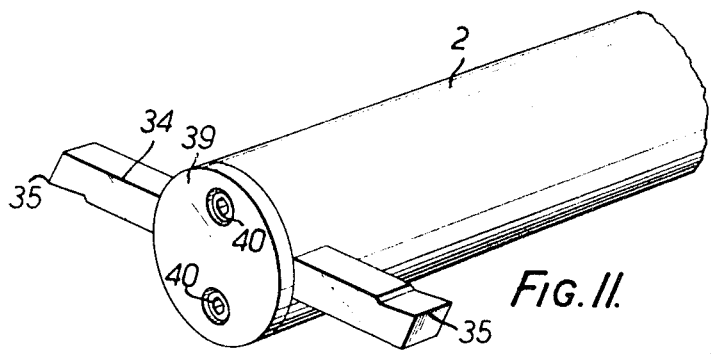
Figure 12:
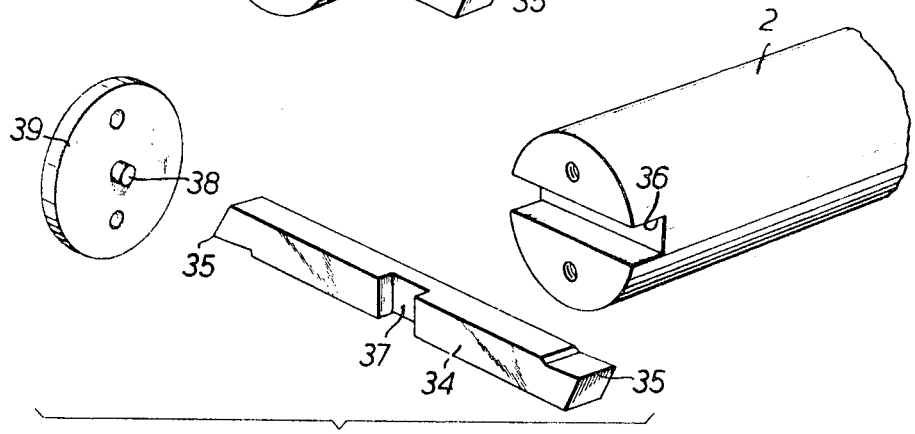
Figure 13:
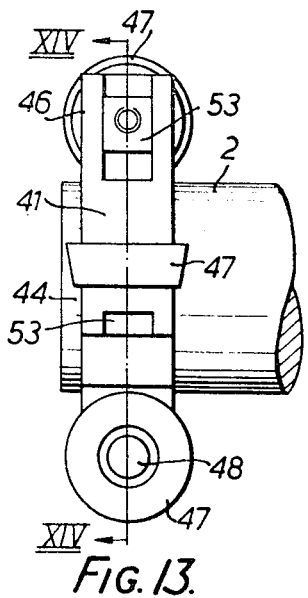
Figure 14:
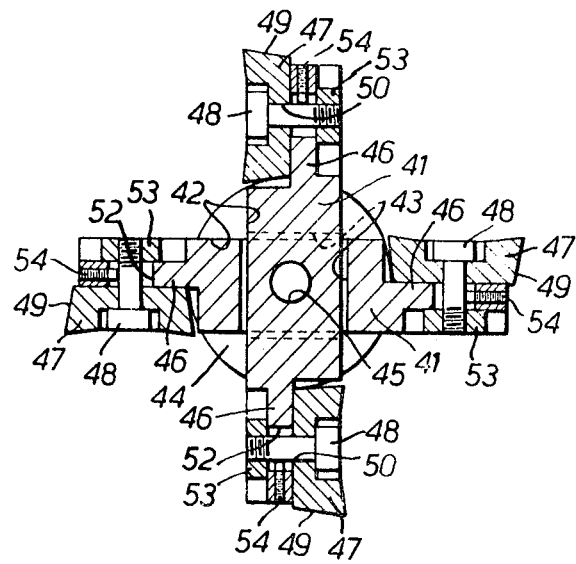

In the drawings:

FIG. 1 is a perspective view of said one reaming tool,

FIG. 2 is a fragmentary longitudinal sectional view, to an enlarged scale, on the line II-II of FIG. 1, FIG. 3 is an end view of a detachable sideplate of the tool of FIGS. 1 and 2, FIGS. 4 and 5 are respectively face and edge views of a cutter of the tool, FIG. 6 is a face view of a location plate of the tool, FIG. 7 shows a cutter and a location plate which together represent one of the modifications, FIG. 8 is a sectional view of the cutter and location plate of FIG. 7 as they appear when fitted together, FIGS. 9 and 10 are respectively face and sectional views of a cutter representing the other modification, FIG. 11 is a fragmentary perspective view of the second reaming tool, FIG. 12 is an "exploded" view of the parts of the tool of FIG. 11, FIG. 13 is a fragmentary side view of the third reaming tool, and FIG. 14 is a sectional view on the line XIV-XIV of FIG. 13.

Referring initially to FIG. 1, the reaming tool illustrated therein comprises a reaming cutter 1 of generally disklike form and a toolholder 2 having a shank one end 3 of which is stepped and laterally slotted to form a tool slot 4 which is closed on one side by a detachable sideplate 5 secured to the end 3 of the holder 2 by retaining means comprising a fixing screw 6 disposed centrally of the slot 4. The other end 7 of the toolholder 2 is formed with a taper shank for insertion in a machine tool spindle, lathe turret or the like. The cutter 1 has a central circular aperture 8 through which the fixing screw 6 passes with clearance. The sideplate 5, which is of part-cylindrical form (as shown particularly in FIG. 3), sits on two shoulders 9 at opposite sides of the slot 4 and has guide means in the form of an elongated V-shaped guide rib 10 (FIG. 3) projecting centrally into the slot 4 and extending in a direction perpendicular to the reaming axis. As shown in FIG. 3, the guide rib 10 is in two aligned portions separated by a bore 12 through which the screw 6 passes.

The cutter 1 is mounted upon the toolholder 2 by means of an intermediate location plate 13 which is of disklike form as shown in FIG. 6. The plate 13 is of smaller diameter than the reaming cutter 1 and incorporates a single diametral V-shaped groove 14 cut into one radial surface and cooperating with the guide rib 10 on the sideplate 5. A central circular aperture 15 in the plate 13 is of the same diameter as the aperture 8 in the cutter 1 and the plate 13 is also formed with an arcuate series of spaced holes 16 (FIG. 6) all of which lie on the same side of the diametral groove 14, a single hole 17 being drilled on the other side of the groove 14.

The plate 13 fits within a central circular recess 18 in the cutter 1 which carries a single projecting dowel peg 19 alternatively engageable with any one of the holes 16 in the plate 13 so that the cutter 1 may occupy any one of six different angular positions in the slot 4 in the toolholder 2. The recess 18 and peg 19 thus provide locating means which accurately locate the cutter 1 with respect to the plate 13. A pin 20 projects from the sideplate 5 into the slot 4 and enters the hole 17, within which it fits with clearance, to ensure that the location plate 13 is not fitted in the holder 2 in a position which is angularly displaced by 180° from its correct position shown in FIG. 2.

Referring to FIGS. 2 and 4, it will be seen that both radial side faces of the cutter disc 1 are formed with angled edge grooves 22 which, together with the peripheral edge 23, are ground to provide the cutting edges of the cutter 1. Two slots 24 (FIG. 4) are milled in the edge 23 at the respective ends of a diameter Y-Y of the cutter 1, the slots 24 effectively dividing the circumferential edge 23 into two equal portions one of which 23a is formed with an edge chamfer 25a on one radial face and the other 23b of which is formed with a similar edge chamfer 25b on the opposite radial face to provide clearance with respect to the bore being reamed.

In use the cutter 1 is mounted in the holder 2 with the peg 19 located in a selected one of the six holes 16 and the toolholder 2 fed axially into a bore in a component (not shown) which is rotated relatively to the tool about the reaming axis, i.e. an axis generally aligned with the longitudinal axis of the toolholder 2. The direction of rotation of the component relative to the cutter 1 is such that the chamfered edges 25a and 25b of the cutter 1 trail in the cutting process, two operative and opposed cutting edges such as 26a and 26b (FIG. 4) leading in the cutting process and engaging the bore so as to ream the latter to a diameter corresponding to the dimension A in FIG. 5.

The interengagement of the rib 10 and the groove 14, together with the fact that the shank of the screw 6 passes with clearance through the apertures 8 and 15 in the cutter 1 and plate 13 respectively, enables the two latter components to float in a direction perpendicular to the reaming axis, with the degree of float, on either side of a central position, being determined by the clearance of the screw 6 within the apertures 8 and 15. The floating action ensures that the cutter 1 is self centering and hence remains concentric with the bore being reamed. It will be appreciated that the combined thickness of the cutter 1 and location plate 13, when the latter are fitted together, is slightly less than the depth of the slot 4 so that the plate 5 does not bind on the plate 13. When the operative cutting edges 26a and 26b become worn, the sideplate 5 is removed by releasing the screw 6 and turning the cutter 1 so that the peg 19 locates in a different one of the six holes 16, with the result that the cutter 1 presents two fresh cutting edges of the portions 23a and 23b respectively. This procedure may be repeated until all the available pairs of cutting edges have been used.

The cutter 1 of the modification of FIGS. 7 and 8 is provided with two locating pegs 19 disposed symmetrically on either side of the central aperture 8 and projecting from one radial face thereof. The pegs 19 are disposed on a diameter Y-Y of the cutter 1 and locate in any one of a plurality of diametrically opposite pairs of angularly spaced holes 16 formed in two arcuate series in the corresponding location plate. The two holes 16 of any one pair are respectively disposed on opposite sides of the diametral groove 14. The outer circumferential periphery 23 of the cutter 1 is angled as shown in FIG. 8 to provide two circumferential edge portions 23a and 23b respectively disposed on the two sides of the diameter Y-Y of the cutter 1. One portion 23a is angled in one direction and is of frustoconical form tapering towards one radial face of the cutter, whereas the other portion 23b is of similar frustoconical form but tapering towards the other face of the cutter 1 so that the latter is asymmetric about its own axis. The two transition points 30 (FIG. 7) between the two oppositely tapering semicircular portions 23a and 23b lie on the diametral line Y-Y.

As before, lateral float is provided by sliding movement of the location plate 13 with respect to the plate 5, and the cutter 1 may be moved to a new angular position so that a fresh portion of its peripheral cutting edge is presented to the bore being reamed by altering the relative angular location of the cutter 1 upon the location plate 13. As with the tool of FIGS. 1 to 5, when all available portions of the cutting edge have been worn only the cutter 1 itself need be replaced, the location plate 13 being retained to locate a fresh cutter 1 in the toolholder 2. As two pegs 19 project from the cutter 1 of the construction of FIGS. 7 and 8, it is not necessary to provide a locating recess 18 as is the case with the cutter 1 of FIGS. 1 to 5.

One radial surface of the cutter 1 of the modification of FIGS. 9 and 10 is formed with a spigotlike projection 32 having three angularly spaced diametral grooves 33 cut into its exposed radial surface. The grooves 33 are of V-shaped form with one central groove 33 being angularly displaced through 45° from each of the two other grooves 33. The cutter 1 is mounted in the tool holder 2 with the shank of the clamping screw 6 passing through the central aperture 8 in the cutter 1, and one of the grooves 33 is engaged by the guide rib 10 on the plate 5 which allows the cutter 1 to float in its own plane and in a direction radially of the reaming axis.

Thus, with this arrangement there is no location plate 13 as with the tools previously described. However, the provision of a location plate 13 is generally to be preferred because with a location plate 13 the cutters 1, which are thrown away when their cutting edges are worn, do not need to be machined with several diametral grooves which is a costly process.

Any one of the three grooves 33 may be engaged by the rib 10, and as the cutting edges wear the screw 6 is slackened off and the cutter 1 rotated to a new angular position in which another of the grooves 33 cooperates with the rib 10 so that new sections of the cutting edges are presented to the component being reamed.

It will be appreciated that the spigotlike projection 32 of the cutter 1 may be formed with more than three grooves 33 to provide a larger number of alternative angular positions of the cutter 1 in the toolholder 2. The number of grooves 33 is largely determined by the diameter of the cutter 1 which with increasing diameter may generally incorporate more grooves 33.

The second form of reaming tool shown in FIGS. 11 and 12 employs an elongated cutter bar 34 each end of which is formed with a cutting edge 35 on the leading side. The cutter 34 is guided for longitudinal sliding movement within a cross slot 36 formed in one end of the shank of the toolholder 2, a portion of which is shown in FIGS. 11 and 12. The cutter 34 is of rectangular cross section and one side edge has, at its center, a recess 37 into which extends a projection 38 (FIG. 12) formed on a circular end plate 39 secured to the end face of the toolholder 2 by screws 40. Longitudinal sliding movement of the cutter 34 within the toolholder 2 provides the floating action which is limited by the freedom of movement of the projection 38 within the cutter recess 37.

If more than two cutting edges are required, two cutter bars 41 may be mounted in mutually perpendicular relationship on the same toolholder 2, to provide the third form of reaming tool shown in FIGS. 13 and 14. In this case the end face of the toolholder 2 has two mutually perpendicular cross slots 42 each of which provides a sliding fit for the corresponding cutter 41. Each cutter 41 is slotted at its midpoint as indicated at 43 to overlap the other cutter in the manner of a half-lap joint, each slot 42 being wider than the common width of the cutters 41 to allow independent longitudinal sliding movement of the cutters 41, as illustrated in FIG. 14. A circular end plate 44 is attached to the end of the toolholder 2 by means of a single central securing screw (not shown) which passes through central circular apertures 45 formed in the two cutters 41 with a clearance which allows for the radial floating movement of the cutters 41. The depth of each slot 42 is slightly greater than the common depth of the cutters 41, i.e. considered in the direction of the reaming axis, so that the end plate 44 does not bind upon the cutters 41 to prevent sliding movement thereof.

The end of each cutter 41 is cut away on opposed sides to provide a reduced thickness mounting portion 46 on the leading side of which a detachable cutting tip 47 is secured by means of a screw 48. Each tip 47 is of generally disklike form with an external frustoconical cutting edge 49 and a central bore 50 through which the corresponding securing screw 48 passes; the screw shank passes through an oversize bore 52 in the corresponding mounting portion 46 and is threaded into a nut 53 which is recessed so that the tip 47 and nut 53 lie generally flush with the cutter 41 as shown in FIG. 14. The outer end of each mounting portion 46 has an adjusting screw 54 threaded therein, and the tip of the screw 54 engages the shank of the corresponding securing screw 48 to provide fine adjustment of the reaming diameter.

The two cutting tools shown in FIGS. 11 to 14 have the particular advantage that they may each be used to ream very close to the base of a blind bore.

When each of the described forms of tool is being used with a capstan lathe, the tool may be mounted on a boring bar rearwardly of the boring tool so that the boring and reaming operations can be performed in one operation from the same turret station.

I claim:

1. A reaming tool comprising a toolholder, a reaming cutter of generally disklike form with opposed cutting edges and mounted on the toolholder so as to project on diametrically opposite sides thereof with a diameter of the cutter parallel with the reaming axis, and retaining and locating means for the holder which provide angular location of the cutter while permitting the latter to float radially of the reaming axis.

2. A reaming tool according to claim 1, wherein the cutter has locating means which enable the cutter to be mounted in the holder in any one of a plurality of different angular positions.

3. A reaming tool according to claim 1, wherein the locating means comprise a plurality of angularly spaced diametral grooves in one radial face of the cutter.

4. A reaming tool according to claim 1, wherein two halves of the outer periphery of the cutter are respectively ground to provide two semicircular cutting edges.

5. A reaming tool according to claim 1, wherein the cutter is received in a lateral through slot in the toolholder, which slot is defined between a shank portion of the holder and a detachable sideplate which is held in position by said retaining means and which is removable for replacement of the cutter.

6. A reaming tool according to claim 1, wherein said location means comprise a location plate mounted between the cutter disk and the toolholder and having on the one hand a slot and guide rib engagement with the latter to guide radial floating movement of the cutter and, on the other hand, a peg and hole connection with the cutter whereby to locate the cutter angularly in a selected one of a plurality of angular positions.

7. A reaming tool according to claim 6, wherein said location plate is formed with a single diametral slot engaged by said guide rib which is formed on the toolholder, and the location plate is also formed with a plurality of holes selectively engageable by a peg projecting from the adjacent side face of the cutter disk.

8. A reaming tool according to claim 7, wherein the location plate fits into a recess in said adjacent face of the cutter disk.

9. A reaming tool according to claim 6, wherein said retaining means comprise a screw by which a detachable sideplate of the toolholder is fixed to a shank portion of the toolholder whereby to retain the cutter disk within a cross slot in the toolholder, said screw passing through the location plate and the cutter disk with a radial clearance which defines the radial float of the cutter.